United States Patent
Gleyzes et al.

(10) Patent No.: US 12,319,108 B2
(45) Date of Patent: Jun. 3, 2025

(54) DEVICE AND METHOD FOR OPERATING A ROLL STABILIZATION SYSTEM

(71) Applicant: Bayerische Motoren Werke Aktiengesellschaft, Munich (DE)

(72) Inventors: Daniel Gleyzes, Munich (DE); Philipp Kugelmann, Munich (DE); Germo Lederer, Munich (DE); Michael Reinsch, Munich (DE); Mario Schmidt, Hallbergmoos (DE); Martin Stumpff, Hoehenkirchen-Siegertsbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/926,258

(22) PCT Filed: May 19, 2021

(86) PCT No.: PCT/EP2021/063223
§ 371 (c)(1),
(2) Date: Nov. 18, 2022

(87) PCT Pub. No.: WO2021/239526
PCT Pub. Date: Dec. 2, 2021

(65) Prior Publication Data
US 2023/0202255 A1    Jun. 29, 2023

(30) Foreign Application Priority Data
May 29, 2020    (DE) .................. 10 2020 114 570.5

(51) Int. Cl.
*B60G 21/055*    (2006.01)
*B60R 16/03*    (2006.01)

(52) U.S. Cl.
CPC ...... *B60G 21/0555* (2013.01); *B60R 16/0307* (2013.01); *B60G 2204/62* (2013.01); *B60G 2400/41* (2013.01); *B60G 2600/20* (2013.01)

(58) Field of Classification Search
CPC ............ B60G 21/0555; B60G 2204/62; B60G 2400/41; B60G 2600/20; B60R 16/0307
(Continued)

(56) References Cited

U.S. PATENT DOCUMENTS 4,796,911 A * 1/1989 Kuroki ............... B60G 21/0558
280/5.511
5,091,679 A * 2/1992 Murty ................ B60G 17/0157
180/2.2
(Continued)

FOREIGN PATENT DOCUMENTS

| CN | 101024371 A | 8/2007 |
| CN | 102834279 A | 12/2012 |

(Continued)

OTHER PUBLICATIONS

International Search Report (PCT/ISA/210) issued in PCT Application No. PCT/EP2021/063223 dated Aug. 31, 2021 with English translation (four (4) pages).
(Continued)

*Primary Examiner* — Frank B Vanaman
(74) *Attorney, Agent, or Firm* — Crowell & Moring LLP

(57) ABSTRACT

A device for operating an active roll stabilization system of a vehicle is described, which active roll stabilization system has a roll stabilizer on at least one axle of the vehicle, which roll stabilizer is configured to adjust, by use of an electrically operated actuator, a degree of twist between lever arms of the roll stabilizer which act on different sides of the axle, in order to counteract a roll movement of the vehicle. The device is set up to determine which operating mode of a (Continued)

plurality of different operating modes of the roll stabilization system has been selected by a user of the vehicle. Further, the device is set up to operate the actuator as a generator, in order to recuperate electrical energy from a roll movement of the vehicle and/or from a roadway-induced movement of the vehicle, in a manner dependent on the selected operating mode.

19 Claims, 2 Drawing Sheets

(58) Field of Classification Search
USPC ............................................ 180/165
See application file for complete search history.

(56) References Cited

U.S. PATENT DOCUMENTS

| | | | | |
|---|---|---|---|---|
| 5,491,633 | A * | 2/1996 | Henry | B60G 17/0182 |
| | | | | 702/33 |
| 6,417,646 | B1 * | 7/2002 | Huykman | G01R 31/396 |
| | | | | 320/122 |
| 6,425,585 | B1 * | 7/2002 | Schuelke | B60G 17/018 |
| | | | | 280/5.511 |
| 6,841,970 | B2 * | 1/2005 | Zabramny | H02J 7/32 |
| | | | | 180/165 |
| 7,261,171 | B2 * | 8/2007 | de la Torre | B60K 25/10 |
| | | | | 180/165 |
| 7,983,814 | B2 * | 7/2011 | Ketteler | B60G 21/0558 |
| | | | | 280/5.502 |
| 9,030,033 | B2 * | 5/2015 | Yoo | B60G 7/006 |
| | | | | 290/1 R |
| 10,029,534 | B2 * | 7/2018 | Giovanardi | F16K 11/065 |
| 2004/0027092 | A1 * | 2/2004 | Patel | H02J 7/0018 |
| | | | | 320/119 |
| 2005/0023789 | A1 * | 2/2005 | Suzuki | B60G 21/0555 |
| | | | | 280/125.106 |
| 2006/0138732 | A1 | 6/2006 | Buma et al. | |
| 2007/0194733 | A1 | 8/2007 | Kurokochi | |
| 2012/0313338 | A1 | 12/2012 | Kondo | |
| 2018/0229577 | A1 | 8/2018 | Triebel et al. | |

FOREIGN PATENT DOCUMENTS

| | | |
|---|---|---|
| DE | 60 2005 003 437 T2 | 10/2008 |
| DE | 10 2009 032 084 A1 | 1/2011 |
| DE | 10 2009 047 102 A1 | 5/2011 |
| DE | 10 2014 225 288 A1 | 6/2016 |
| DE | 10 2015 200 124 A1 | 7/2016 |
| DE | 10 2016 221 316 A1 | 5/2018 |
| EP | 1 679 208 A1 | 7/2006 |

OTHER PUBLICATIONS

German-language Written Opinion (PCT/ISA/237) issued in PCT Application No. PCT/EP2021/063223 dated Aug. 31, 2021 (eight (8) pages).

German-language Search Report issued in German Application No. 10 2020 114 570.5 dated Jun. 16, 2021 with partial English translation (12 pages).

Chinese-language Office Action issued in Chinese Application No. 202180037060.9 dated Mar. 20, 2025 with English translation (19 pages).

* cited by examiner

DEVICE AND METHOD FOR OPERATING A ROLL STABILIZATION SYSTEM

BACKGROUND AND SUMMARY

The invention relates to a device and to a corresponding method for operating a roll stabilization system, in particular in order to increase the comfort and/or the energy efficiency of a vehicle.

A multitrack vehicle can have an active, in particular an electromechanical, roll stabilization system designed to reduce and/or compensate rolling movements of the vehicle. The vehicle can be e.g. an ICE (internal combustion engine), an MHEV (Mild-Hybrid Electrical Vehicle), a PHEV (Plugin-Hybrid Electrical Vehicle) or a BEV (Battery Electrical Vehicle). By reducing the rolling movements, the comfort of the vehicle can be increased and/or the driving behavior of the vehicle can be improved.

The present document is concerned with the technical problem of enabling a flexible and/or optimized compromise between comfort and energy efficiency of a vehicle with an active roll stabilization system.

The object is achieved by each of the independent claims. Advantageous embodiments are described inter alia in the dependent claims. It is pointed out that additional features of a patent claim dependent on an independent patent claim can form an invention without the features of the independent patent claim, or just in combination with some of the features of the independent patent claim, which stands on its own and is independent of the combination of all the features of the independent patent claim and which can be made the subject of an independent claim, a divisional application or a subsequent application. This applies in the same way to technical aspects or teachings described in the description, which can form an invention that is independent of the features of the independent patent claims.

According to one aspect, a device for operating an active roll stabilization system of a (motor) vehicle is described. On at least one axle (e.g. on the rear axle and/or on the front axle) of the vehicle, the roll stabilization system of the vehicle comprises a (electromechanical) roll stabilizer designed to rotate lever arms of the roll stabilizer, which act on different sides of the axle, in opposite directions by means of an electrically operated actuator (e.g. an electric motor) in order to counteract a rolling movement of the vehicle. In other words, the actuator of the roll stabilizer may be configured to adjust, modify and/or control a rotation of the lever arms of the roll stabilizer.

The device is configured to determine which operating mode from a plurality of different operating modes of the roll stabilization system was selected by a user (in particular the driver) of the vehicle. The plurality of different operating modes can include e.g. a compensation mode (which e.g. is directed primarily to roll stabilization of the vehicle) and a recovery mode (which e.g. is directed primarily to the recovery of electrical energy from rolling movements of the vehicle). In this respect, the number of different operating modes can be high enough that intermediate operating modes between a (pure) compensation mode and a (primary and/or pure) recovery mode can be selected and/or adjusted virtually steplessly.

The vehicle may comprise a user interface which enables the user of the vehicle to make one or more user inputs, in particular by actuating an operator control element of the user interface. For example, the user interface can comprise an operator control element, by means of which one of the different operating modes of the roll stabilization system can be selected. In this respect, one of the operating modes can be selected optionally implicitly in the context of selecting a driving mode (e.g. a comfort mode or a sport mode or an energy saving mode). In other words, one of the operating modes can be selected by actuating a driving experience switch. The device may therefore be configured to determine, on the basis of a user input from the user, which operating mode was selected by the user of the vehicle.

The device is also configured to operate the actuator at least partially and/or temporarily as a generator depending on the selected operating mode, in order to recover electrical energy from a rolling movement of the vehicle and/or from a roadway-induced movement of the vehicle (in particular from a roadway-induced movement of wheels of the vehicle). In particular, the device may be configured to operate the actuator of the at least one roll stabilizer (passively or as a generator) to recover electrical energy from a rolling movement or (actively or as a motor) to compensate the rolling movement of the vehicle depending on the selected operating mode.

It is therefore possible to enable selective use (that can be chosen by a user) of a roll stabilizer for the purpose of roll stabilization or recovery of electrical energy. Therefore, an optimized compromise between comfort and energy efficiency of a vehicle can be enabled.

The compensation mode may be designed in such a way that the actuator of the at least one roll stabilizer is operated actively (i.e. as a motor) more frequently, for a longer period of time, and/or more strongly or intensively, at least on average over time, in the compensation mode than in the recovery mode in order to counteract rolling movements of the vehicle. As an alternative or in addition, the recovery mode may be designed in such a way that the actuator is operated (as a generator) more frequently and/or for a longer period of time and/or more intensively, at least on average over time, in the recovery mode than in the compensation mode in order to recover electrical energy from rolling movements of the vehicle.

The different operating modes, in particular the recovery mode and the compensation mode, can therefore differ in terms of the intensity of the stabilization performed by the roll stabilizer. In this respect, the energy balance of the vehicle can be improved by reducing the extent of the stabilization (in the recovery mode) (even when the actuator functions as a motor over the same period of time in the recovery mode and in the compensation mode). The different operating modes may, if appropriate, have different ways of triggering the actuator (e.g. a different parametrization of the motor regulator).

As an alternative or in addition, the recovery mode may be designed in such a way that the actuator on average over time generates more electrical energy than it consumes for the purpose of roll stabilization of the vehicle. By contrast, the compensation mode may be designed in such a way that the actuator on average over time generates less electrical energy than it consumes for the purpose of roll stabilization of the vehicle.

By providing operating modes that are complementary in this way, it is particularly effectively made possible for the user to achieve an optimized compromise between comfort and energy efficiency of the vehicle.

The one or more operating modes of the roll stabilization system may each establish one or more stabilization driving situations of the vehicle, in which the actuator is operated actively for the purpose of roll stabilization of the vehicle. Furthermore, the one or more operating modes of the roll stabilization system may each establish one or more recovery driving situations of the vehicle, in which the actuator is operated as a generator for the purpose of recovering electrical energy from rolling movements of the vehicle.

Exemplary driving situations in this context are a cornering maneuver or straight-ahead travel. A driving situation may be defined by one or more driving parameters of the vehicle. Exemplary driving parameters are: the speed of the vehicle, the acceleration of the vehicle, the steering angle of the steering mechanism of the vehicle, the steering angle speed of the steering mechanism of the vehicle, etc. The different driving situations may be defined by different combinations of parameter values for the one or more abovementioned driving parameters.

The different operating modes of the roll stabilization system can differ at least in part with respect to the establishment of the one or more stabilization driving situations and/or the one or more recovery driving situations. By establishing specific driving situations for the operation of the actuator of a roll stabilizer as a motor or as a generator, it is possible to enable reliable switching between the different operating modes.

The device may be configured to ascertain driving data relating to the current journey of the vehicle. The driving data may indicate e.g. the steering angle and/or the steering angle speed of the steering mechanism of the vehicle. In particular, the driving data may indicate current parameter values for one or more of the abovementioned driving parameters.

Furthermore, the device may be configured to ascertain, on the basis of the driving data and on the basis of the selected operating mode, whether (at a current point in time) a stabilization driving situation or a recovery driving situation of the vehicle is present. The actuator of the at least one roll stabilizer can then be operated depending on whether a stabilization driving situation or a recovery driving situation is present. In particular, the actuator can be utilized for the purpose of roll stabilization when a stabilization driving situation is present. By contrast, the actuator can be utilized to recover electrical energy when a recovery driving situation is present. It is therefore particularly reliably possible to provide an optimized compromise between comfort and energy efficiency.

The compensation mode and the recovery mode can be defined in such a way that at least one driving situation, which is specified as stabilization driving situation in the compensation mode, is specified as recovery driving situation in the recovery mode. In this respect, in the recovery mode, in particular straight-ahead travel of the vehicle, in which the steering angle and/or the steering angle speed is smaller in terms of magnitude than a predefined threshold value, can be a recovery driving situation (whereas this straight-ahead travel constitutes a stabilization driving situation in the compensation mode). In this context, during straight-ahead travel, the roll stabilizer typically primarily corrects roadway stimuli (i.e. regulation of external disturbances).

Optionally, the recovery of electrical energy during straight-ahead travel of the vehicle may be restricted. By contrast, during a cornering maneuver, roll stabilization may (at least primarily) continue to effected. The use of the at least one roll stabilizer for recovery purposes can therefore be restricted, if appropriate, to limiting the comfort (whereas drive-stabilizing measures are continued). As an alternative, the rolling dynamics of the vehicle imposed during a cornering maneuver can (at least partially), if appropriate, be used to recover electrical energy.

The electrical on-board power system of the vehicle may comprise a first electrical subsystem having a first system voltage (e.g. a 48 V system) and a second electrical subsystem having a second system voltage (e.g. a 12 V system). The first and the second system voltage may in this case be the same (e.g. each 12 V) or different. The actuator of the at least one roll stabilizer may be arranged in the first subsystem. Furthermore, the first subsystem may comprise an energy store (e.g. an electrochemical energy store, for instance a lithium-ion battery) for storing electrical energy for the operation of the actuator and/or for buffering current and/or voltage peaks while the actuator is being operated as a motor or as a generator.

The device may be configured to detect the recovery of the electrical energy by the actuator of the at least one roll stabilizer. This may be detected e.g. on the basis of the selected operating mode and/or on the basis of the current driving situation.

Furthermore, the device may be configured to transfer electrical energy from the first subsystem to the second subsystem in response to the detected recovery and/or in response to the detected voltage difference between the two subsystems, in particular by operating a (bidirectional) DC voltage converter between the first subsystem and the second subsystem. The electrical energy recovered can therefore be used to operate a second electrical subsystem of the vehicle. In this way, the energy efficiency of the vehicle can be increased further.

The device may be configured to determine the inability of the energy store to fully take up the electrical energy recovered by the actuator of the at least one roll stabilizer, in particular owing to a delimited charging power of the energy store and/or owing to a delimited storage capacity of the energy store. For example, it can be identified that the recovered electrical power is greater than the charging power of the energy store of the first subsystem. As an alternative or in addition, it can be identified that the state of charge of the energy store of the first subsystem is high enough that the recovered electrical energy cannot be (fully) taken up by the energy store.

The device may be configured (optionally only) in response thereto to operate the DC voltage converter between the first subsystem and the second subsystem in order to transfer electrical energy from the first subsystem to the second subsystem. In this way, it is possible to have the effect that the recovered electrical energy is utilized as fully as possible by the vehicle, with the result that the energy efficiency of the vehicle can be further improved.

According to a further aspect, a (road) motor vehicle (in particular a passenger car or a truck or a bus) comprising the device described in the present document is described.

According to a further aspect, what is described is a (computer-implemented) method for operating an active roll stabilization system of a vehicle, which, on at least one axle of the vehicle, comprises a roll stabilizer designed to adjust (in particular to control or to regulate to a determined setpoint value) a rotation between lever arms of the roll stabilizer, which act on different sides of the axle, by means of an electrically operated actuator, in order to counteract a rolling movement of the vehicle.

The method comprises determining an operating mode from a plurality of different operating modes of the roll stabilization system that was selected by a user of the vehicle. The method also comprises operating the actuator as a motor and/or as a generator, depending on the operating mode selected. In the process, depending on the operating mode selected, electrical energy can be at least partially and/or temporarily recovered from a rolling movement of the vehicle and/or from roadway-induced movements (of the axle) of the vehicle.

According to a further aspect, a software (SW) program is described. The SW program may be configured to be executed on at least one processor (e.g. on one or more controllers of a vehicle), and to carry out the method described in the present document as a result.

According to a further aspect, a storage medium is described. The storage medium may comprise a SW program which is configured to be executed on a processor, and to carry out the method described in the present document as a result.

It should be noted that the methods, devices and systems described in the present document can be used both individually and in combination with other methods, devices and systems described in the present document. Furthermore, any aspects of the methods, devices and systems described in the present document may be combined with one another in a wide variety of ways. In particular, the features of the claims may be combined with one another in a wide variety of ways.

The invention is also described in more detail with reference to exemplary embodiments.

DETAILED DESCRIPTION OF THE DRAWINGS

Figure 1A:
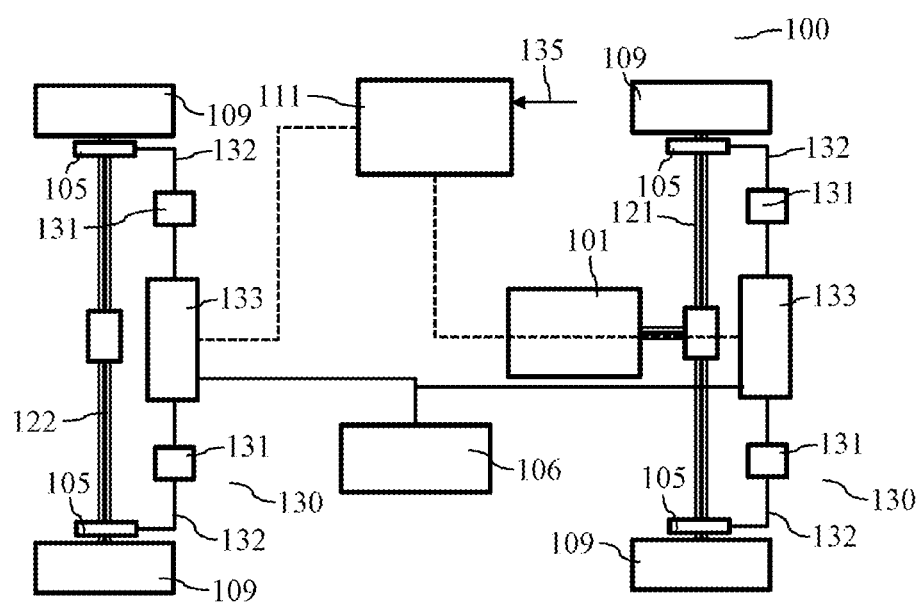
FIG. 1a shows exemplary components of a vehicle having a roll stabilization system.

As set out in the introduction, the present document is concerned with increasing the energy efficiency of a vehicle having a roll stabilization system. In this context, FIG. 1a shows exemplary components of a vehicle 100. The vehicle 100 comprises a drive motor 101 (e.g. an internal combustion engine and/or an electric machine) which is designed to drive at least one axle 121 (e.g. the rear axle) of the vehicle 100. The vehicle 100 typically comprises a further axle 122 (e.g. the front axle). Wheels 109 are arranged on the axles 121, 122 of the vehicle 100.

The (two-track) vehicle 100 illustrated in FIG. 1 comprises an active (roll) stabilizer 130 for each axle 121, 122. The lever arms 132 of a stabilizer 130 are each attached to the chassis of the vehicle 100 via a bearing 131. In this context, the lever arms 132 each act (indirectly) on the wheel carriers 105 of a wheel 109. A lever arm 132 may act indirectly on the wheel carrier 105 of a wheel 109, e.g. via a damper or a connecting rod.

In particular, a stabilizer 130 comprises a right-hand lever arm 132 for the right-hand wheel 109 and a left-hand lever arm 132 for the left-hand wheel 109 of an axle 121, 122. The two lever arms 132 of the stabilizer 130 may be rotated in opposite directions via an actuator 133, which typically comprises an electric machine, in order to make forces that counteract a rolling movement act on the wheels 109 of an axle 121, 122.

The electrical energy for the operation of the actuator 133 of a stabilizer 133 can be drawn from an electrical energy store 106. The operation of the actuator 133 can be controlled by at least one control unit (or by a triggering device) 111, for instance by a central control unit and/or by multiple decentralized control units. In particular, regulation may be carried out in order to bring about a determined setpoint behavior of the vehicle 100 with respect to rolling movements.

Figure 1B:
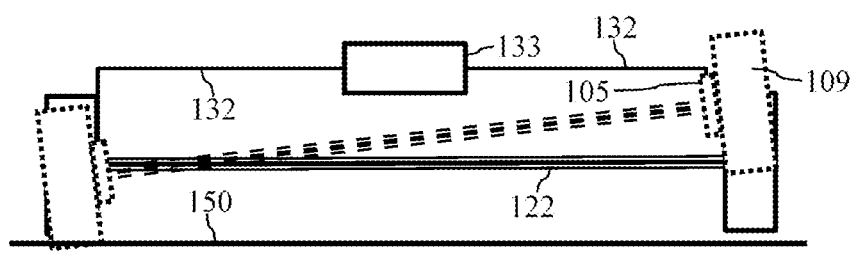
FIG. 1b shows an exemplary effect of roadway unevenness on a stabilizer of a vehicle.

FIG. 1b illustrates how a rolling movement of the vehicle 100 can be brought about owing to unevenness of the roadway 150 on which the vehicle 100 is traveling and/or owing to a cornering maneuver. The stabilizer 130 can make forces that counteract such a rolling movement act on the lever arms 132 by triggering the actuator 133.

Figure 2:
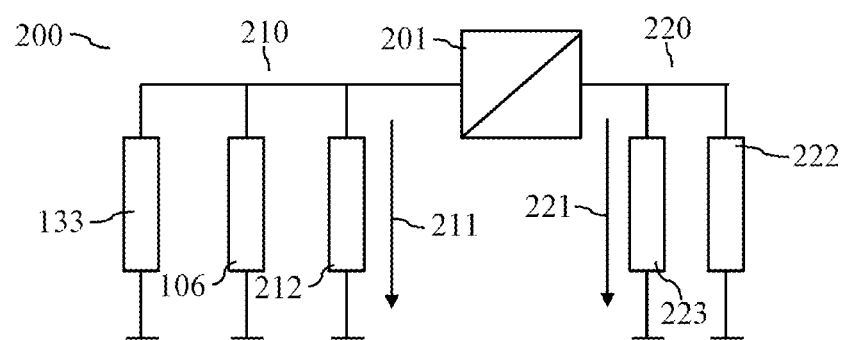
FIG. 2 shows an exemplary multi-voltage on-board power system.

FIG. 2 shows an exemplary electrical on-board power system 200 of a vehicle 100. The on-board power system 200 may comprise multiple subsystems 210, 220 with different system voltages 211, 221. In particular, a first subsystem 210 (e.g. a 48 V system) may have a first system voltage 211 (e.g. 48 V), and a second subsystem 220 (e.g. a 12 V system) may have a second system voltage 221 (e.g. 12 V). The subsystems 210, 220 may be connected to one another via a DC voltage converter 201 in order to enable the transfer of electrical energy between the subsystems 210, 220.

In an alternative scenario, both subsystems 210, 220 may have the same system voltage 211, 221 (e.g. 12 V). The subsystems 210, 220 may be arranged in series. In this case, if appropriate, no DC voltage converter 201 is required between the subsystems 210, 220.

The one or more stabilizers 130 of the vehicle 100 may be arranged in the first subsystem 210 as electrical consumers 212. An energy store of the first subsystem 210 may be used as energy store 106 for the one or more stabilizers 130 (e.g. a lithium-ion-based energy store). The second subsystem 220 may correspondingly comprise one or more electrical consumers 222 and/or an electrical energy store 223.

The vehicle 100 may comprise a user interface (not illustrated) for a user, in particular for a driver, of the vehicle 100. The user interface may comprise e.g. at least one operator control element enabling the user to select an operating mode 135 of the stabilization system of the vehicle 100 having the one or more stabilizers 130. Exemplary operating modes 135 are a compensation mode, in which rolling movements of the vehicle 100 are compensated as comprehensively as possible by active engagement of the actuators 133 of the one or more stabilizers 130; and a recovery mode, in which rolling movements of the vehicle 100 are compensated only to a reduced extent (compared to the compensation mode), but in which the actuators 133 of the one or more stabilizers 130 are operated at least temporarily as electrical generators, in order to generate electrical energy on the basis of the rolling movements of the vehicle 100. In the process, the electrical energy recovered can be stored in the energy store 106 of the first subsystem 210.

If appropriate, a multiplicity of different operating modes that enable e.g. (virtually) stepless adjustment between a compensation mode (with stabilization which is as comprehensive as possible) and a recovery mode (with recovery which is as comprehensive as possible) can be enabled and/or selected and/or adjusted.

The control unit 111 may be configured to determine in which operating mode the (roll) stabilization system of the vehicle 100 is operated. The actuators 133 of the one or more stabilizers 130 may then be operated depending on the operating mode selected. In particular, the actuators 133 can be made to generate electrical energy on the basis of the rolling movement of the vehicle 100 when a determination has been made that the stabilization system should be operated in the recovery mode.

Furthermore, the control unit 111 may be configured (when the stabilization system is operated in the recovery mode) to operate the DC voltage converter 201 in such a way that electrical energy is transferred from the first subsystem 210 to the second subsystem 220. Expressed generally, the at least one control unit 111 may be configured to bring about the transfer of electrical energy from the first subsystem 210 to the second subsystem 220 (when the stabilization system is operated in the recovery mode and/or when there is a voltage difference between the subsystems 210, 220).

This can be effected in particular when it is ascertained that the energy store 106 of the first subsystem 210 has a relatively high state of charge (e.g. a state of charge above a determined state-of-charge threshold value). In this way, the effect can reliably be brought about that excessive recovered electrical energy can be utilized for operating one or more electrical consumers 222 in the second subsystem 220 and/or for storage in the energy store 223 of the second subsystem 220. This therefore brings about an increase in the energy efficiency of the vehicle 100.

It is consequently possible to provide a recovery mode of the stabilization system of the vehicle 100 that has a positive energy balance (with the result that, on average over time, more electrical energy is generated by the actuators 133 of the one or more stabilizers 130 than is consumed by the actuators 133 for the purpose of roll stabilization). In this respect, the stabilization system may be operated e.g. in the 48 V on-board power system 210 of the vehicle 100.

Excess energy from the recovery of the stabilization system can be transferred from the 48 V store 106 to the 12 V on-board power system 220. The energy transferred can be utilized for 12 V consumers 222. This means that less energy needs to be taken from a HV (high-voltage) on-board power system of the vehicle 100 and/or from a generator, thereby resulting in an increased range of the vehicle 100 and/or in a reduction of the (possibly electrical) energy consumption or $CO_2$ emissions of the vehicle 100.

During operation of the stabilization system, for example, the vehicle 100 can travel in the recovery mode along a roadway 150 with relatively large and/or a relatively large number of unevennesses. During the journey, electrical energy can be recovered by the one or more actuators 133 and stored in the (optional) 48 V store 106. Excess energy can be transferred from the 48 V store 106, e.g. via the (bidirectional) DC voltage converter 201, to the 12 V on-board power system 220. If appropriate, given a corresponding design of the converter 201 (with sufficiently high power dynamics), operation without a store 106 is enabled.

Figure 3:
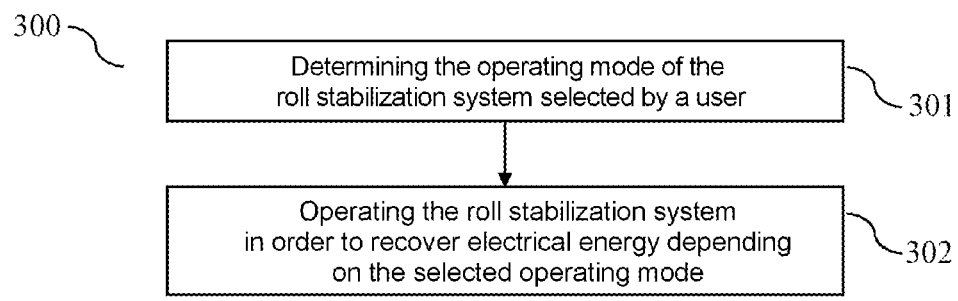
FIG. 3 shows a flow diagram of an exemplary method for operating a stabilization system.

FIG. 3 shows a flow diagram of an exemplary (optionally computer-implemented) method 300 for operating an active roll stabilization system of a (motor) vehicle 100. The method 300 can be carried out by a device or by a control unit 111 of the vehicle 100.

On at least one axle 121, 122 of the vehicle 100, the roll stabilization system comprises a roll stabilizer 130 designed to rotate lever arms 132 of the roll stabilizer 130, which act on different sides of the axle 121, 122, in different directions by means of an electrically operated actuator 133 (in particular by means of an electric machine or by means of an electric motor), in order to counteract a rolling movement of the vehicle 100. The roll stabilization system may comprise a first roll stabilizer 130 for a first axle 121, e.g. the rear axle, and a second roll stabilizer 130 for a second axle 122, e.g. the front axle, of the vehicle 100.

The method 300 comprises determining 301 which operating mode 135 from a plurality of different operating modes 135 of the roll stabilization system was selected by a user of the vehicle 100. The operating mode 135 may have been selected e.g. via a user interface of the vehicle 100. The roll stabilization system may be operated e.g. (as standard practice) in a compensation mode. Furthermore, the roll stabilization system can be operated in a recovery mode. In this respect, the recovery mode may be designed in such a way that, in this mode, the amount of electrical energy that can be recovered by the roll stabilization system can be increased (compared to the compensation mode). By contrast, the compensation mode may optionally have higher comfort with respect to the roll stabilization than the recovery mode. If appropriate, in the compensation mode there is no recovery at all of electrical energy by the roll stabilization system.

The method 300 also comprises operating 302 the actuator 133 of the at least one roll stabilizer 130 (as a motor and/or as a generator) depending on the selected operating mode 135. In the process, the actuator 133 of the at least one roll stabilizer 130 can be utilized to recover electrical energy from a rolling movement of the vehicle 100 and/or from roadway-induced wheel movements. If appropriate, the actuator 133 (in a determined driving situation) can be operated in the compensation mode in such a way that no electrical energy is recovered by the actuator 133 (but, if appropriate, the actuator 133 is actively triggered for roll stabilization of the vehicle 100). By contrast, the actuator 133 (in the determined driving situation) can be operated in the recovery mode in such a way that electrical energy is recovered by the actuator 133 (and the actuator 133 is not actively triggered, or is actively triggered only to a reduced extent compared to the compensation mode, for roll stabilization of the vehicle 100).

The selective use of a roll stabilizer 130 for recovering electrical energy makes it possible to provide an optimized compromise between comfort and energy efficiency of a vehicle 100.

The present invention is not restricted to the exemplary embodiments shown. In particular, it should be noted that the description and the figures are intended only to illustrate the principle of the proposed methods, devices and systems.

The invention claimed is:

1. A device for operating an active roll stabilization system of a vehicle, the active roll stabilization system having, on at least one axle of the vehicle, a roll stabilizer configured to adjust a rotation of lever arms of the roll stabilizer, comprising:
   an electrically operated actuator that actuates the lever arms on different sides of the axle in order to counteract a rolling movement of the vehicle, wherein
      the device is operatively configured to:
         determine which operating mode from a plurality of different operating modes of the roll stabilization system has been selected by a user of the vehicle; and
         depending on the selected operating mode, operate the actuator as a generator in order to recover electrical energy from a rolling movement of the vehicle and/or from a roadway-induced movement of the vehicle; and
   an electrical on-board power system of the vehicle that comprises a first electrical subsystem with a first DC system voltage and a second electrical subsystem with a second DC system voltage; wherein the actuator is arranged in the first electrical subsystem; and the device is further operatively configured to:
  detect the recovery of electrical energy by the actuator, wherein
    a detected recovery of the electrical energy by the actuator brings about a transfer electrical energy from the first electrical subsystem to the second electrical subsystem, by operating a DC voltage converter between the first electrical subsystem and the second electrical subsystem, and
    the recovered electrical energy is greater than a charging energy of an energy store of the first electrical subsystem.

2. The device according to claim 1, wherein
the plurality of different operating modes comprise at least one compensation mode and at least one recovery mode; and
  the actuator is operated actively as a motor more frequently, for a longer period of time, and/or more strongly, at least on average over time, in the compensation mode than in the recovery mode in order to counteract rolling movements of the vehicle; and/or
  the actuator is operated as a generator more frequently and/or for a longer period of time and/or more intensively, at least on average over time, in the recovery mode than in the compensation mode in order to recover electrical energy from rolling movements of the vehicle.

3. The device according to claim 2, wherein
the recovery mode is designed in such a way that the actuator on average over time generates more electrical energy than the actuator consumes for roll stabilization of the vehicle and/or compensation of roadway unevennesses; and/or
the compensation mode is designed in such a way that the actuator on average over time generates less electrical energy than the actuator consumes for roll stabilization of the vehicle and/or compensation of roadway unevennesses.

4. The device according to claim 1, wherein the plurality of a different operating modes each establish:
  one or more stabilization driving situations of the vehicle, in which the actuator is operated actively as a motor for roll stabilization of the vehicle; and/or
  one or more recovery driving situations of the vehicle, in which the actuator is operated as a generator for recovering electrical energy from rolling movements of the vehicle; and
  the operating modes differ at least in part with respect to establishment of the one or more stabilization driving situations and/or the one or more recovery driving situations.

5. The device according to claim 4, wherein the device is further operatively configured to:
  ascertain driving data relating to a current journey of the vehicle, wherein
    the driving data indicate a steering angle and/or a steering angle speed of a steering mechanism of the vehicle;
  based on the driving data and the selected operating mode, ascertain whether a stabilization driving situation or a recovery driving situation is present; and
  operate the actuator depending on whether the stabilization driving situation or the recovery driving situation is present.

6. The device according to claim 4, wherein
the plurality of different operating modes comprises a compensation mode and a recovery mode; and
at least one driving situation specified as stabilization driving situation in the compensation mode is specified as recovery driving situation in the recovery mode.

7. The device according to claim 6, wherein,
in the recovery mode, straight-ahead travel of the vehicle, in which a steering angle and/or a steering angle speed is smaller in terms of magnitude than a predefined threshold value, is a recovery driving situation.

8. The device according to claim 1, wherein
the vehicle comprises a user interface, by which the user of the vehicle makes one or more user inputs by actuating an operator control element; and
the device is further operatively configured to determine, based on a user input from the user, which operating mode was selected by the user of the vehicle.

9. The device according to claim 1, wherein
the energy store of the first electrical subsystem stores electrical energy for operation of the actuator; and
the device is further operatively configured to:
  determine an inability of the energy store to fully take up the electrical energy recovered by the actuator due to a delimited charging power and/or a delimited storage capacity of the energy store.

10. A method for operating an active roll stabilization system of a vehicle, which, on at least one axle of the vehicle, comprises a roll stabilizer designed to adjust a rotation between lever arms of the roll stabilizer, which act on different sides of the axle, via an electrically operated actuator in order to counteract a rolling movement of the vehicle, the method comprising:
  determining which operating mode from a plurality of different operating modes of the roll stabilization system was selected by a user of the vehicle;
  operating the actuator depending on the selected operating mode as a generator, in order to recover electrical energy from a rolling movement of the vehicle and/or from a roadway-induced movement of the vehicle;
  determining an inability of an energy store to fully take up the electrical energy recovered by the actuator due to a delimited charging power and/or a delimited storage capacity of the energy store; and
  in response thereto, operating a DC voltage converter between a first electrical subsystem comprising the energy store and a second electrical subsystem in order to transfer electrical energy from the first electrical subsystem to the second electrical subsystem, wherein the determined inability includes at least that the recovered electrical energy is greater than a charging energy of the energy store of the first electrical subsystem.

11. A device for operating an active roll stabilization system of a vehicle, the active roll stabilization system having, on at least one axle of the vehicle, a roll stabilizer configured to adjust a rotation of lever arms of the roll stabilizer, comprising:
  an electrically operated actuator that actuates the lever arms on different sides of the axle in order to counteract a rolling movement of the vehicle, wherein
    the device is operatively configured to:
      determine which operating mode from a plurality of different operating modes of the roll stabilization system has been selected by a user of the vehicle; and depending on the selected operating mode, operate the actuator as a generator in order to recover electrical energy from a rolling movement of the vehicle and/or from a roadway-induced movement of the vehicle, wherein a first electrical subsystem comprises an energy store for storing electrical energy for operation of the actuator; and the device is further operatively configured to:

determine an inability of the energy store to fully take up the electrical energy recovered by the actuator due to a delimited charging power and/or a delimited storage capacity of the energy store, wherein a determined inability of the energy store to fully take up the electrical energy recovered by the actuator, brings about an operation of a DC voltage converter between the first electrical subsystem and a second electrical subsystem in order to transfer electrical energy from the first electrical subsystem to the second electrical subsystem, and the determined inability includes at least that the recovered electrical energy is greater than a charging energy of the energy store of the first electrical subsystem.

12. The device according to claim 11, wherein the plurality of different operating modes comprise at least one compensation mode and at least one recovery mode; and the actuator is operated actively as a motor more frequently, for a longer period of time, and/or more strongly, at least on average over time, in the compensation mode than in the recovery mode in order to counteract rolling movements of the vehicle;

and/or the actuator is operated as a generator more frequently and/or for a longer period of time and/or more intensively, at least on average over time, in the recovery mode than in the compensation mode in order to recover electrical energy from rolling movements of the vehicle.

13. The device according to claim 12, wherein the recovery mode is designed in such a way that the actuator on average over time generates more electrical energy than the actuator consumes for roll stabilization of the vehicle and/or compensation of roadway unevennesses; and/or the compensation mode is designed in such a way that the actuator on average over time generates less electrical energy than the actuator consumes for roll stabilization of the vehicle and/or compensation of roadway unevennesses.

14. The device according to claim 11, wherein the plurality of a different operating modes each establish:

one or more stabilization driving situations of the vehicle, in which the actuator is operated actively as a motor for roll stabilization of the vehicle; and/or one or more recovery driving situations of the vehicle, in which the actuator is operated as a generator for recovering electrical energy from rolling movements of the vehicle; and the operating modes differ at least in part with respect to establishment of the one or more stabilization driving situations and/or the one or more recovery driving situations.

15. The device according to claim 14, wherein the device is further operatively configured to:

ascertain driving data relating to a current journey of the vehicle, wherein the driving data indicate a steering angle and/or a steering angle speed of a steering mechanism of the vehicle;

based on the driving data and the selected operating mode, ascertain whether a stabilization driving situation or a recovery driving situation is present; and operate the actuator depending on whether the stabilization driving situation or the recovery driving situation is present.

16. The device according to claim 14, wherein the plurality of different operating modes comprises a compensation mode and a recovery mode; and at least one driving situation specified as stabilization driving situation in the compensation mode is specified as recovery driving situation in the recovery mode.

17. The device according to claim 16, wherein, in the recovery mode, straight-ahead travel of the vehicle, in which a steering angle and/or a steering angle speed is smaller in terms of magnitude than a predefined threshold value, is a recovery driving situation.

18. The device according to claim 11, wherein the vehicle comprises a user interface, by which the user of the vehicle makes one or more user inputs by actuating an operator control element; and the device is further operatively configured to determine, based on a user input from the user, which operating mode was selected by the user of the vehicle.

19. The device according to claim 11, wherein the first electrical subsystem operates with a first DC system voltage; and the second electrical subsystem operates with a second DC system voltage, wherein the actuator is arranged in the first electrical subsystem.

* * * * *